US006422463B1

(12) United States Patent
Flink

(10) Patent No.: US 6,422,463 B1
(45) Date of Patent: Jul. 23, 2002

(54) ACCESS CONTROL SYSTEM

(76) Inventor: Jonathan C. Flink, 372 Preble St., South Portland, ME (US) 04106

( * ) Notice: Subject to any disclaimer, the term of this patent is extended or adjusted under 35 U.S.C. 154(b) by 0 days.

(21) Appl. No.: 09/476,023

(22) Filed: Dec. 31, 1999

(51) Int. Cl.[7] .................................................. G06K 5/00

(52) U.S. Cl. ....................................... 235/382; 235/380

(58) Field of Search ................................ 235/375–386; 340/500, 568.1; 712/34, 32

(56) References Cited

U.S. PATENT DOCUMENTS

| | | | | |
|---|---|---|---|---|
| 3,988,570 A | | 10/1976 | Murphy | |
| 4,004,134 A | | 1/1977 | Hwang | |
| 4,095,739 A | | 6/1978 | Fox et al. | |
| 4,218,690 A | | 8/1980 | Ulch et al. | |
| 4,538,056 A | | 8/1985 | Young et al. | |
| 4,544,832 A | | 10/1985 | Young et al. | |
| 4,808,803 A | | 2/1989 | Magier et al. | |
| 5,594,917 A | * | 1/1997 | Palermo et al. | 712/34 |
| 5,705,991 A | | 1/1998 | Kriffin et al. | |
| 5,774,053 A | * | 6/1998 | Porter | 340/568.1 |
| 5,971,273 A | * | 10/1999 | Vallaire | 235/381 |
| 6,102,286 A | * | 8/2000 | Hammond | 235/380 |
| 6,300,873 B1 | * | 10/2001 | Kucharczyk et al. | 340/568.1 |

FOREIGN PATENT DOCUMENTS

JP 09212608 A * 8/1997

* cited by examiner

*Primary Examiner*—Michael G. Lee
*Assistant Examiner*—Jamara A. Franklin
(74) *Attorney, Agent, or Firm*—Frederick R. Cantor, Esq.

(57) ABSTRACT

A system for controlling access to a secured building area can include a programmable logic controller that is used to interpret data encoded on cards presented to a card reader at a locked door. The logic controller has one processor for decoding input signals, and another processor for comparing decoded data with data in a database, for thus generating a door-unlock signal. The programmable logic controller determines the permissions associated with the data encoded on the card presented, and unlocks the door if such access is permitted. Ancillary systems are easily integrated into the control system due to the modularity of a programmable logic controller-based system. Fire alarm override, burglar alarm systems, and infant security systems may be integrated into the system disclosed.

5 Claims, 5 Drawing Sheets

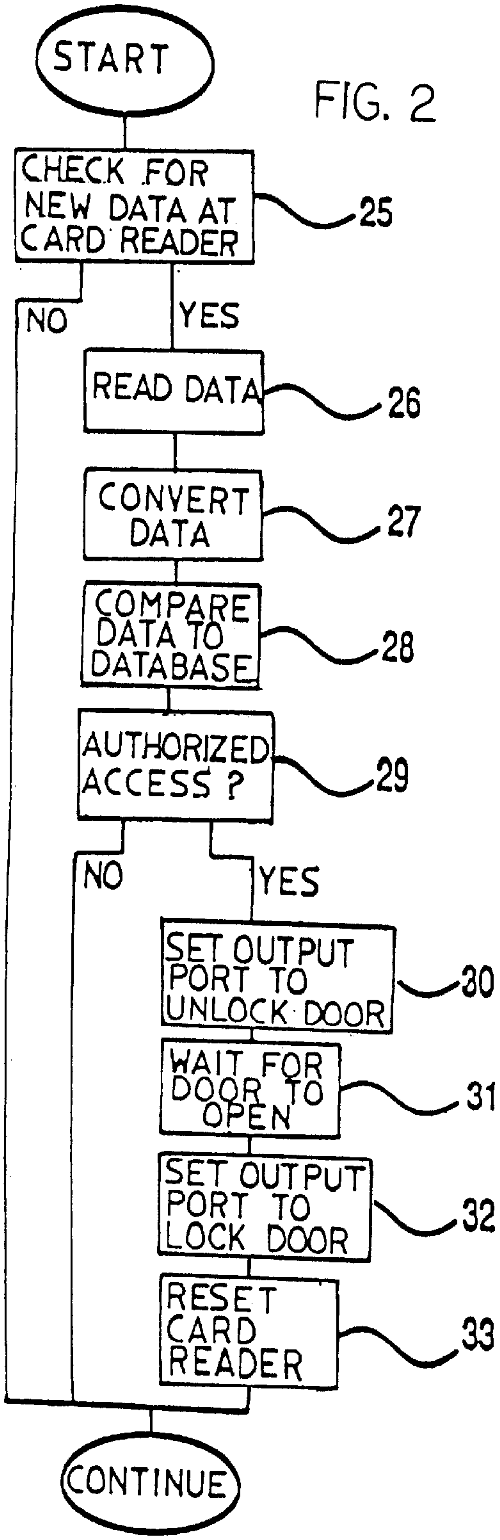
FIG. 2
FIG. 3
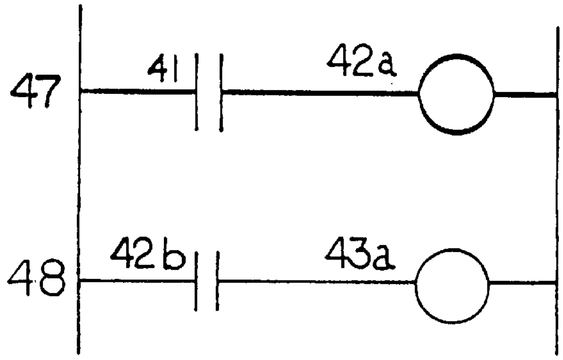

ACCESS CONTROL SYSTEM

BACKGROUND

This invention relates to a security system for controlling access to a building or secured area. Security systems for buildings are typically available in a variety of types and complexity. Generally, most modern security systems utilize an identification card or badge having encoded data therein. The identification card or badge acts as the "key" to unlock doors. One seeking to gain access through a locked door presents the identification card or badge to a card reader. If the bearer of the card or badge is granted permission, the door is unlocked.

A security system using electronically detectable identification cards or badges requires a control system that can decode the data encoded in the identification card or badge, and determine the access permission before signalling the actuation of the door lock. A computer-controlled system is typically used. A central computer having a database of access permissions for all active identification cards or badges is employed. These computer-based systems are readily available and are in common use today.

The problem presented to the use of the prior art security systems is the expansion of the system to accommodate growth, and the integration of the security with ancillary systems that would enhance the operation and administration of security within the building or secured area. A security system in a building having public access, for example, may employ a conventional computer-based access control system. To incorporate a fire alarm system to allow for emergency egress, and override the electronic door locks is difficult to perform while still retaining any logic functions in the security system. The typical override in a conventionally integrated system is to shut down the security system, and unlock all doors. This condition, though certainly effective in the event of a fire, may constitute a breach of security in a false alarm situation.

A security system in a hospital may utilize an infant protection system that triggers an alarm when an infant is moved in an unauthorized manner to an exit to the maternity ward. Typically, the infant wears an unobtrusive transmitting unit on its ankle, wrist, or umbilical cord, that is detected by monitors installed at the ward exits. An alarm condition may be used for a signal to lock the door, thereby thwarting any attempted abduction of the infant. While these systems allow for override when an authorized staff member relocates a protected infant, the system and its override control is administered separately from a centralized building control system.

Additionally, integration of a separate infant control system to a door locking security system and a fire alarm system, is logistically difficult to achieve while maintaining any centralized administration. One attempting to abduct an infant need only trigger the fire alarm to create a distraction, and override the door locking functions, to facilitate his misdeeds. Preferably, a system that integrates the fire alarm, infant protection, and door locking system would retain operation in selected areas, allowing for authorized, and controlled, exit at all times.

The invention described herein addresses the need for a flexible and easily adaptable system for controlling the areas of ingress and egress to, from, and within a building or secured area. The use of a programmable logic controller in place of a conventional computer-based central processing unit allows for this needed expandability, modularity, while providing for ease of programming.

Programmable logic controllers are traditionally used in process control applications in manufacturing and industrial environments. They are particularly adapted to controlling steps that occur at specific times and in a specified sequence according to various parameters, or steps that occur in response to specific events.

The programmable logic controller is a computerized relay bank; for a given or expected input, an output signal is generated in response. The logic incorporated into the programmable logic controller may be depicted in the form of a ladder logic diagram. The programmable logic controller steps through the ladder in a scan of its input ports, changing the state of the output ports accordingly.

A programmable logic controller is inherently expandable due to its modular design. Additional ports may be added by merely plugging in a new input-output module into the controller. Additionally, program changes and additions may be readily implemented as a result of the intuitive ladder logic program structure.

BRIEF SUMMARY OF THE INVENTION

The present invention is directed to an apparatus that satisfies the need for a modular and flexible control system for an access and control system for a building or secured area. The use of a programmable logic controller in place of a conventional computer-based central processing unit allows for expandability, modularity, and ease of programming. Ancillary systems may be readily interfaced by coupling to an input port, without having to reconfigure the entire system.

In summary, and in accordance with the above discussion, the foregoing objectives are achieved in the following embodiments.

A programmable logic controller, having a database of personnel information resident in its memory is used to control access through a door to a secured area. The programmable logic controller has a basic module for co-processing functions, and an input-output module. A card reader is placed at the secured door location, and is coupled to the basic module of the programmable logic controller. An electronically actuated door lock that secures the door in a locked state is coupled to an output port of the input-output module. An encoded identification badge is presented to the card reader by one seeking access through the secured door. The encoded identification number from the badge is decoded by the basic module, and compared to the authorization and permissions associated with the identification number in the database. If the permissions associated with the identification number permits access, the door is unlocked by changing the state of the output port coupled to the door lock at the secured door.

In accordance with an aspect of this invention, there is provided the ability to condition the actuation of the door lock through the signalling of an alarm from an ancillary system coupled to an input port of the input-output module. Alarm signals from additional ancillary systems may, in combination, further condition the actuation of the door lock.

BRIEF DESCRIPTION OF THE SEVERAL VIEWS OF THE DRAWINGS

FIG. 2 is a flowchart schematic of the system operation.

FIG. 3 is a ladder logic diagram depicting a portion of the operation of the card reading function of the system.

DETAILED DESCRIPTION OF THE INVENTION

Referring particularly to FIGS. 1 through 6 thereof, there is shown an access and control system for controlling access to, from, and within a secured building or area.

Figure 1:
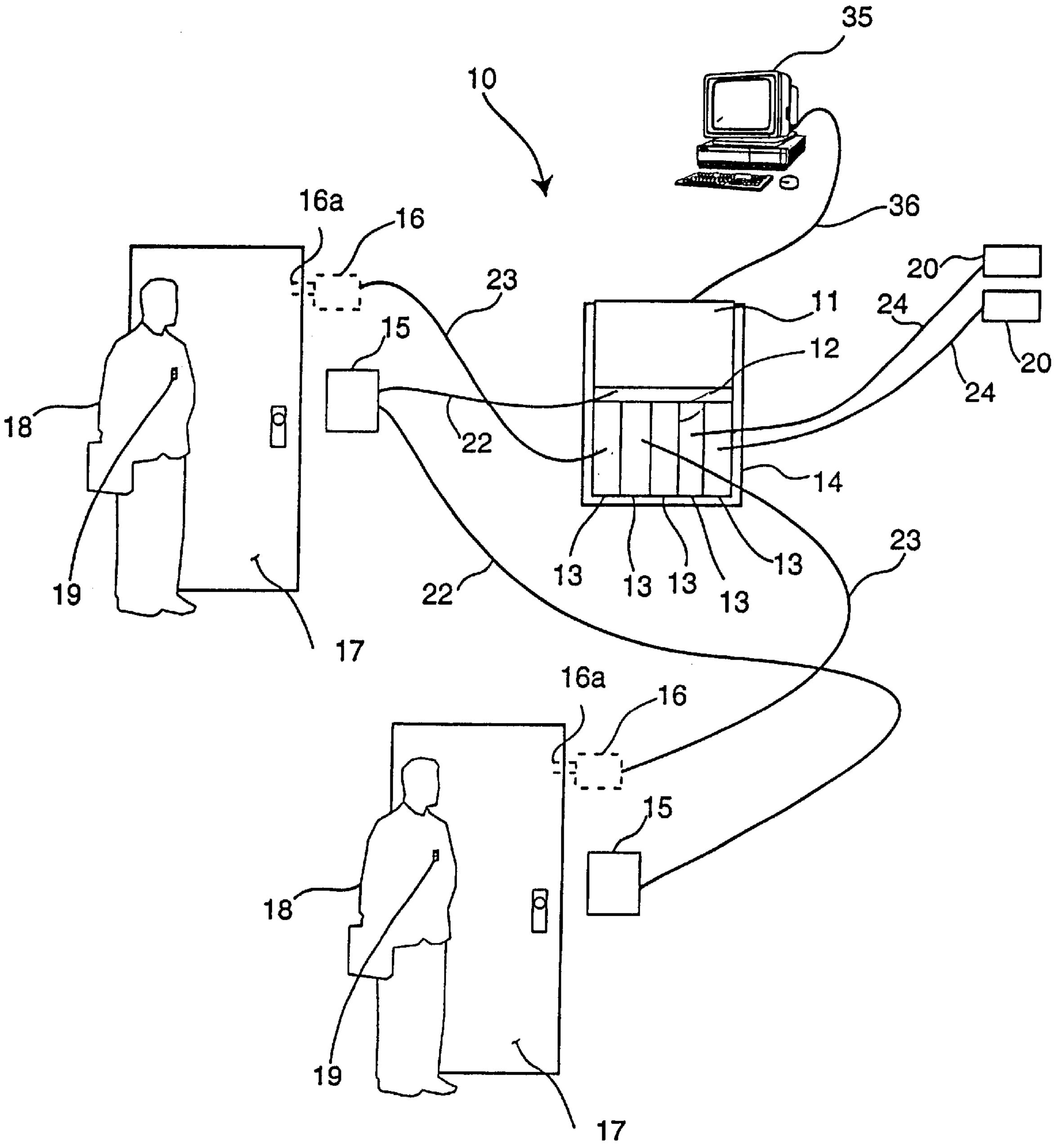
FIG. 1 is schematic view of the Access Control System, constructed according to the present invention.

FIG. 1 is a schematic view of the Access Control System 10. The heart of the system comprises a programmable logic controller 11, a basic module 12, and at least one input-output module 13. Typically, multiple input-output modules 13 will be mounted in a rack 14.

An Allen-Bradley 580e PLC, or equivalent, has been successfully used as the basis of a security system for the programmable logic controller 11 according to the present embodiments. The system includes power supply modules for converting available power to meet the requirements of the programmable logic controller 11. The system also includes memory for retaining the programming logic, and a first processor for performing logic functions.

In the most basic embodiment, according to FIG. 1, the system must also include a card reader 15, a door lock 16, a door 17, and an identification badge 19 that may be worn by a person 18. The identification badge 19 is a commonly known and used credit-card sized badge that may be encoded with an identification code using a bar code printed on the surface, a magnetic stripe placed on the surface, and/or a proximity emitting device embedded therein. The card reader 15 must be matched to detect any or all of the data encoding methods, i.e., magnetic stripe, bar code, and/or proximity sensing. Presenting the encoded identification card 19 to the card reader allows the system to determine that a person seeks access to the area secured by the locked door 17. Presumably, alternative means can be employed to uniquely identify a person to a detecting equivalent of a card reader 15. Retinal scan, fingerprint detection, and voiceprint are such alternatives.

The door lock 16 must be capable of being actuated from an electrical signal source. It may physically engage a bar 16*a* into the door 17 that may be extracted when actuated in a solenoid fashion. Similarly, an electronically actuated latch plate may be used for the door lock 16. Alternatively, the door lock 16 may constitute a magnetically actuated element that creates a magnetic field when locked, thereby attracting a metal plate secured to the door 17. The magnetic attraction of the plate on the door 17 to magnetically actuated door lock 16 creates resistance to opening that effectively locks the door 17 from ingress or egress.

The door lock 16 is coupled to an output port of the input-output module 13 of programmable logic controller 11. The programmable logic controller 11 may set the state of the output port coupled to the door lock 16 through a door lock signal cable 23, thereby locking or unlocking the door 17. Low voltage direct current is typically used, though nearly any signalling requirements may be accommodated through conversion adapters. The door lock may be configured as normally open, or normally closed, depending upon the security impact in the event of power failure. Safety concerns may dictate that a complete power failure must allow for personnel to exit safely through the door secured by door lock 16.

The card reader 15 is coupled to the basic module 12 of the programmable logic controller 11, as shown in FIG. 1 by a communications cable 22. When an identification badge is presented to the card reader 15, the encoded identification number is transmitted to the programmable logic controller 11 through communications cable 22. In the present embodiment, an RS-485 data highway bus has been found to be successful for the communications cable 22. Up to 32 card readers may be connected to a single RS-485 bus, over a total distance of up to 4,000 feet. The modular connection of subsequent card readers 15 allows for expansion of the system as facility growth requires.

The function of the basic module 12 is to co-process the identification of the encoded card data from identification card 19 so that the processor of the programmable logic controller 11 is not overloaded, so that processing scan times are minimized. An Allen Bradley SLC-504 has been selected for use in the present embodiment to perform this function. The basic module 12 contains a second processor with memory, and is coupled directly to the memory and processor of the programmable logic controller 11. The basic module 12 receives the data read by card reader 15, and decodes the data to a format that can be compared to the access permissions list in the database resident in the programmable logic controller 11. A table containing a list of identification numbers of cards set up in the system resides in the memory of the programmable logic controller 11, and the associated personal identification number, typically, the social security number unique to each employee or person requiring access. A table lookup function is performed by the basic module 12, and using a block transfer mode, passes the personal identification number to the main processor in the programmable logic controller 11.

FIG. 2 depicts a flowchart for the operation of the basic embodiment of the Access Control System. A first step 25 determines if there is data to be read by card reader 15. if there is no data, i.e., there is no person seeking access, the program continues to loop. If data is present, the data is read at second step 26, and converted through a table lookup function at step 27. The programmable logic controller 11 compares the data read and converted to the list of permissions and associated identification numbers at step 28. If the person seeking access does not have the permissions necessary to gain access, the program continues its loop and any subsequent door unlocking routines are not run, as depicted in step 29. If access is authorized, the programmable logic controller 11 then sets an output port state to unlock the door where access is sought at step 30. A delay at step 31 may be executed to pause while the door is opened. The programmable logic controller then sets the output port state to lock the door at step 32, and resets the card reader to allow more data to be read at last step 33.

Additional secured sites may be added to the system by adding a card reader 15 to the communications cable 22, and connecting another door lock 16 to another output port of the input-output module 13 of the programmable logic controller 11. Both the new card reader 15 and door lock 16, and any subsequent sites, must be within range of the RS-485 communications requirements, or equivalent, using the communications cable 22 and the door lock signal cable 23.

A remote processing unit may be configured to extend the range and number of secured sites by adding an additional basic module 12 and additional input-output modules 13 in a remotely placed rack 14. These units may be remotely placed, while coupled to the programmable logic controller 11 through the communications cable 22.

The flowchart depicted in FIG. 2 is then subsequently performed for each site in sequence by the programmable logic controller 11. The system is programmed through the use of a ladder logic, a portion of which is depicted in FIG. 3. The complex decision making process is reduced to a series of boolean operations that are performed sequentially.

The programmable logic controller 11 scans sequentially through the ladder structure. At rung 47, normally open switch 41 is closed if there is new data presented at the card reader 15. The. coil 42*a* is then turned on, which signals a transfer of data from the card reader 15 to the basic module 12. Upon completion of the data transfer, normally open switch 42*b* is closed. When switch 42*b* is closed, coil 43*a* is turned on, which triggers. the next step in the process. The programmable logic controller 11 scans rapidly through the entire ladder structure continuously, so that there is no delay or apparent pause in the processing of any one step.

The ladder structure may be programmed into the programmable logic controller using known methods and commercially available control program software packages; RS-Logics being one example. A personal computer 35 coupled to the programmable logic controller 11 through a network cable 36 allows for programming, and database administration from the remote personal computer 35. Commercially available software, such as RS-Links, may be used to facilitate communication between the programmable logic controller 11 and the personal computer 35.

The database resident in the programmable logic controller 11 may be synchronized with a central personnel database for the facility, so that changes in staff or authorization may be kept current. The synchronization may be performed at regular intervals, or manually initiated upon demand. The central database may reside in most commercially available database management systems, including MS-Access, and Oracle. The database need only be accessible through the network coupled to the programmable logic controller 11 through network cable 36, and capable of exchanging records dynamically.

Additionally, the access control system 10 may be monitored graphically through the personal computer 35. Commercially available software, such as RS-View permits administrators to view the programmable logic controller 11 functions using simulation techniques. Monitoring of the system, though not required for system operation, allows for system design, troubleshooting, and optimization.

One of the key features of the access control system 10 is the ability to integrate ancillary systems into the overall building protection system. Logic determining access permissions may be conditioned upon a signal of a superseding event. For example, a door normally unlocked may be locked in an alarm condition, though one with access permissions may present their card to the card reader at the locked door, and be granted access.

An ancillary system 20 is coupled to an input port of the input-output module 13 of the programmable logic controller 11 through input cable 24. The ancillary system 20 signals the alarm condition through input cable 24 by changing the state detected at the input port of input-output module 13. This ancillary system 20 may be a fire alarm, burglar alarm, broken window sensor, infant security system, motion detector, panic button, or any subsystem within a building that when signalling an alarm may impact the decision to lock (or unlock) a door.

The ancillary system 20 is typically coupled to the input port of input-output module 13 in a normally closed fashion so that tampering, or failure of the subsystem, results in an alarm condition.

Multiple ancillary systems 20 may be integrated into the access control system 10 through the availability of, or expanded availability of, additional input ports in the input-output module 13 of the programmable logic controller 11. The ladder logic in the memory of the programmable logic controller 11 must then accommodate the ancillary system, though it would be treated as just another step its continuous scan during operation.

Figure 4:
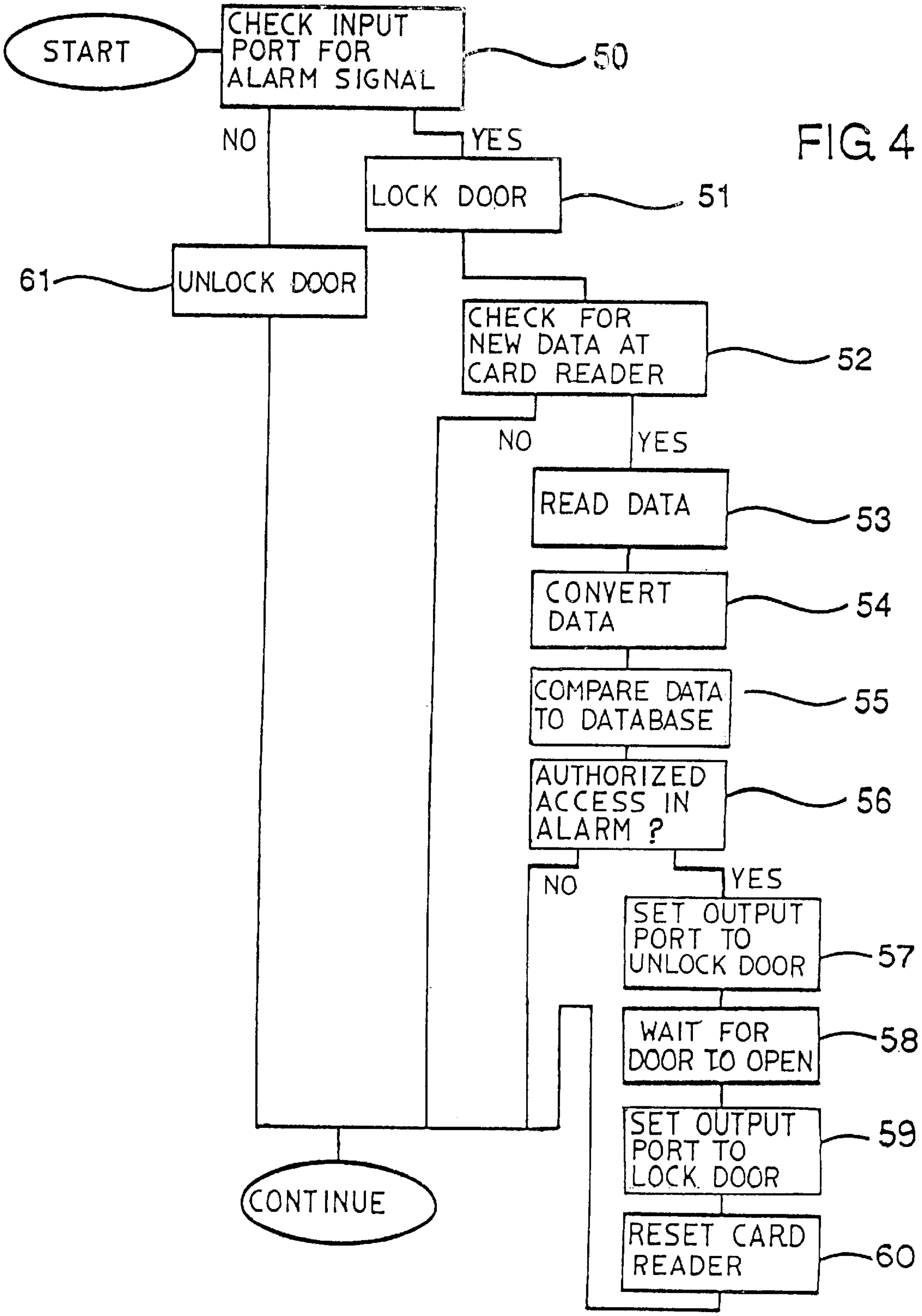
FIG. 4 is a flowchart of the system with an ancillary alarm input.

FIG. 4 depicts a flowchart for the operation of the access control system 10 with an ancillary system installed. The flowchart depicts the situation for a normally open door to be locked in an alarm condition, though granting access to those having permissions assigned in the database resident in the programmable logic controller 11.

During the continuous scan of the ladder logic structure, an alarm condition will be observed when an input port of input-output module 13 assigned to the alarm is switched (e.g., by opening a normally closed circuit). A first step 50 determines if an alarm condition exists; if no alarm is observed, the scan continues. If an alarm is observed, the output port of input-output module 13 assigned to the door 17 to be secured is set to lock, as shown in step 51. With the door 17 now locked, access to the secured area is controlled through the permissions associated with an identification card 19 presented to the card reader 15 at the secured door 17.

Step 50 determines if there is data to be read by card reader 15. If there is no data, i.e., there is no person seeking access, the program continues to loop. If data is present, the data is read at step 53, and converted through a table lookup function at step 54. The programmable logic controller 11 compares the data read and converted to the list of permissions and associated identification numbers at step 55. If the person seeking access does not have the permissions necessary to gain access in the alarm condition, the program continues its loop and any subsequent door unlocking routines are not run, as depicted in step 56. The database may be configured to allow access during no alarm condition, while restricting access during the alarm.

If access is authorized, the programmable logic controller 11 then sets the state of the output port assigned to door lock 16 at locked door 17 to unlock the door where access is sought at step 57. A delay at step 58 may be executed to pause while the door is opened. The programmable logic controller 11 then sets the state of the output port to again lock the door at step 59, and resets the card reader to allow more data to be read at last step 60.

During any subsequent scan, if the alarm state has. ended (e.g., by closing the normally closed circuit to the ancillary system 20), the locked door will be unlocked at step 61. The programmable logic controller 11 is instructed to set the state of the output port assigned to the door lock 16 of the locked door 17 to be unlocked.

Figure 5:
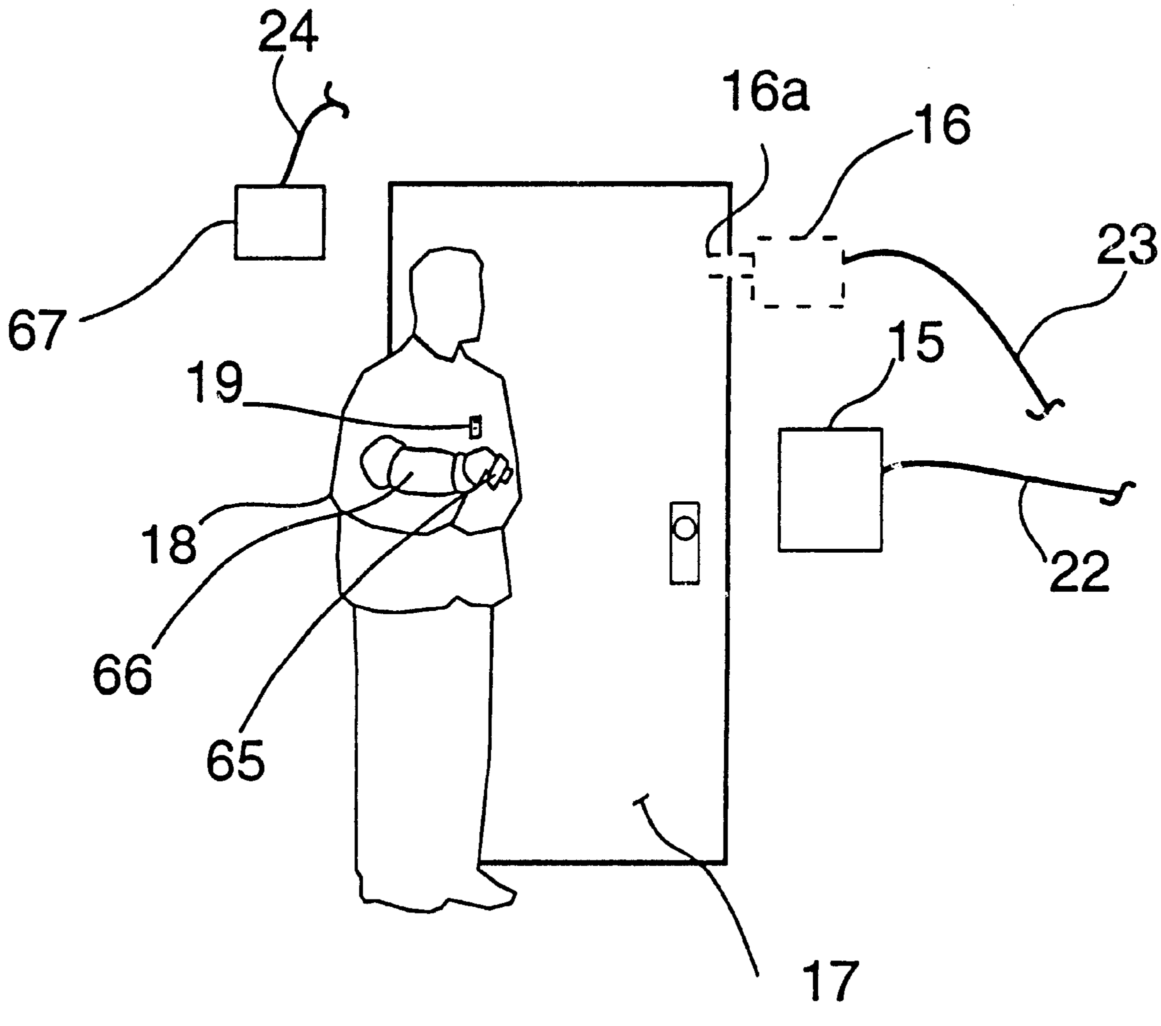
FIG. 5 is a schematic view of an infant protection system using the Access Control System, constructed according to the present invention.

The process depicted in FIG. 4 may be exemplified through an embodiment of the invention installed in a hospital having a maternity ward with infant protection as shown in FIG. 5. High traffic and a desire for public access dictates the need for normally unlocked doors, that automatically lock when an infant is being removed in an unauthorized fashion. Infant protection systems typically comprise a transmitting device 65 affixed to the ankle or clothing of an infant 66, and a proximity receiving device 67 mounted near a door 17 or exit. Asportation of the infant 66 wearing the transmitting device 65 towards the door 17 near the receiving device 67 triggers an alarm. The alarm condition may be used to signal the locking of the door, thereby thwarting abduction of the infant.

Integration of the infant protection system into the Access Control System 10 may be facilitated through a coupling of the alarm signal from the receiving device 67 to an input port of input-output module 13 through input cable 24. Hospital staff authorized to transport infants out of the maternity ward may then present the identification card or badge 19 to the card reader 15. If the permissions in the database in the memory of the programmable logic controller 11 associated with the identification badge presented authorize the transfer of the infant 66, then the door lock 16 will be released.

While a stand-alone infant security system is commonly known and used, its integration into an access control system having a common database with hospital staff records and authorizations is provided by the present invention. Additionally, enhancements to the operation of the system may be provided through logic applied to conditions external to the infant security system.

Figure 6:
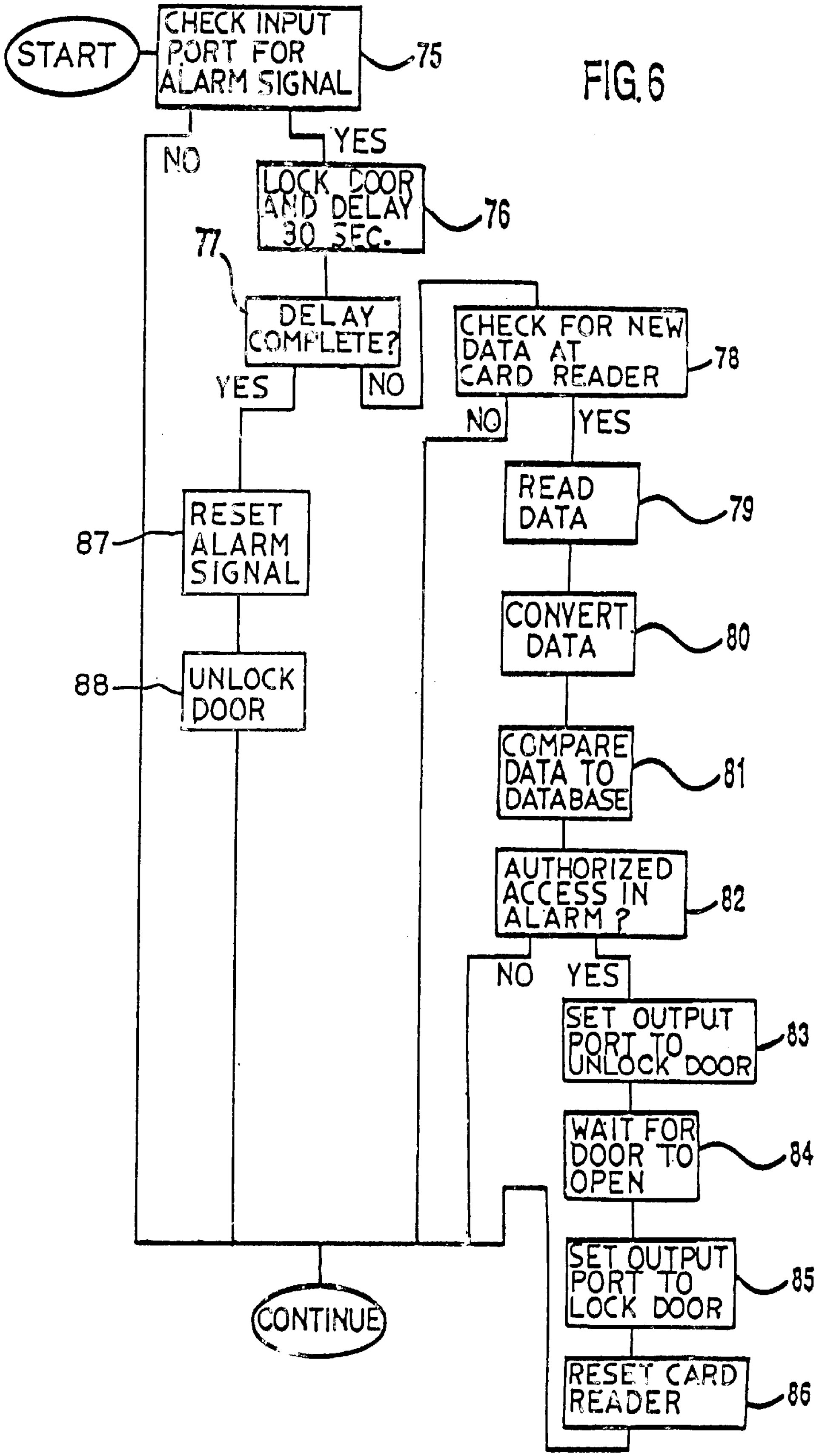
FIG. 6 is a flowchart of the system with multiple ancillary alarm inputs.

The ancillary system 20 exemplified as an infant security system may be further enhanced through the addition of a plurality of ancillary systems, all integrated in combination as a plurality of input signals to the input-output module 13 of the programmable logic controller 11. For example, one attempting to abduct an infant may create a distraction by first triggering a fire alarm. A prior art access control system will, by default, be preempted by a fire alarm so that safety of personnel is not compromised in the event of fire. In the present invention, a fire alarm condition in the maternity ward need not default to unrestricted egress. FIG. 6 depicts a flowchart that describes the operation of the Access Control System with a plurality of alarm conditions.

During the continuous scan of the ladder logic structure, an alarm condition will be observed when an input port of input-output module 13 assigned to the alarm is switched (e.g., by opening a normally closed circuit). A first step 75 determines if an alarm condition exists; if no alarm is observed, the scan continues. The door, normally unlocked, remains accessible to all. If an alarm is observed, the output port of input-output module 13 assigned to the door 17 to be secured is set to lock, as shown in step 76. A delay of thirty seconds occurs, during which time one authorized to egress may present his identification badge 19 to the card reader 15 to unlock the door 17.

In the embodiment of the invention as it is deployed in an infant protection system, this counter-intuitive step to. lock all exit doors upon the initial trigger of a fire alarm for thirty seconds allows for the staff to ensure that there was no intentional false alarm to create a distraction to facilitate the abduction of an infant.

During the thirty second delay, a staff member may unlock any door to the area by presenting the identification badge 19 to the card reader 15. Step 78 determines if there is data to be read by card reader 15. If there is no data, i.e., there is no person seeking access, the program continues to loop. If data is present, the data is read at step 79, and converted through a table lookup function at step 80. The programmable logic controller 11 compares the data read and converted to the list of permissions and associated identification numbers at step 81. If the person seeking access does not have the permissions necessary to gain access in the alarm condition, the program continues its loop and any subsequent door unlocking routines are not run, as depicted in step 82. The database may be configured to allow access during no alarm condition, while restricting access during the alarm.

If access is authorized, the programmable logic controller 11 then sets the state of the output port assigned to door lock 16 at locked door 17 to unlock the door where access is sought at step 83. A delay at step 84 may be executed to pause while the door is opened. The programmable logic controller 11 then sets the state of the output port to again lock the door at step 85, and resets the card reader to allow more data to be read at last step 86.

During any subsequent scan, if thirty second delay has completed, the alarm signal will be reset at step 87, and the locked door will be unlocked at step 88, thereby resuming normal operation.

The present invention, described above, relates to a system for controlling access to a secured area. Features of the present invention are recited in the appended claims. The drawings contained herein necessarily depict structural features and embodiments of the Access Control System, useful in the practice of the present invention.

However, it will be appreciated by those skilled in the arts pertaining thereto, that the present invention can be practiced in various alternate forms, proportions, and configurations. Further, the previous detailed description of the preferred embodiment of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. An apparatus for controlling access through plural doors of secured building areas comprising:

a programmable logic controller comprising a first processor with memory, a database resident in said memory of said first processor, at least one input-output module, and a basic module having a second processor with memory;

a card reader associated with each said door, each said reader being coupled to an input port of an input-output module;

an electronically actuated door lock for each said door, each said lock being coupled to an output port of an input-output module; and a card for each person requiring access to said secured areas, each said card having an encoded identification number;

whereby presentment of a card to a card reader is detected by the programmable logic controller, which then actuates the door lock, depending upon the permissions associated with the encoded identification number of the card in the database;

said second processor being connected directly to each said card reader through an input port, so that said second processor is enabled to decode card reader data to a format that said first processor can compare to data in the database of the logic controller;

said first processor receiving decoded card reader data from said second processor, whereby said first processor is enabled to compare the decoded data with data in said database, for setting the state of an output port that is coupled to a particular door lock;

said first processor including first cyclic control means (47) for monitoring data flow from each card reader to said second processor, and second cyclic control means (48) for monitoring data flow from said second processor to said first processor, for programming the signal to the output ports.

2. The apparatus of claim 1, and further comprising a personal computer coupled to said programmable logic controller for remote administration of the database stored in said memory of said first processor.

3. The apparatus of claim 1, and further comprising at lease one ancillary alarm coupled to a designated input port of said input-output module;

said first processor being programmed to respond to an alarm signal received from said designated input port via said second processor, so that said first processor generates an override signal for setting at least some of the output ports in a reverse non-normal status.

4. The apparatus of claim 3, wherein the ancillary alarm is a burglar alarm, and the override signal sets the associated output ports in a door-lock condition.

5. The apparatus of claim 3, wherein the auxiliary alarm comprises a signal transmitting device affixed to an infant requiring protection against abduction through a designated door, and a proximity sensor located near said designated door;

and said proximity sensor being coupled to said transmitting device so that when the sensor is triggered by the transmitting device, an alarm signal is applied to said designated input port.

* * * * *